United States Patent [19]
Shiroki

[11] Patent Number: 5,078,203
[45] Date of Patent: Jan. 7, 1992

[54] HOT WATER TYPE FLOOR HEATING PANEL

[76] Inventor: Shigetomo Shiroki, 56-20, Gokoumutsumi, Matsudo City, Chiba Prefecture, Japan

[21] Appl. No.: 671,951

[22] Filed: Mar. 19, 1991

[30] Foreign Application Priority Data

Mar. 23, 1990 [JP] Japan .................... 2-74163

[51] Int. Cl.⁵ .................................. F24H 9/06
[52] U.S. Cl. .......................... 165/56; 165/49; 237/69
[58] Field of Search ............ 237/69; 126/431; 165/56, 49

[56] References Cited

U.S. PATENT DOCUMENTS

| | | | |
|---|---|---|---|
| 2,681,796 | 6/1954 | Rapp | 165/56 |
| 4,212,348 | 7/1980 | Kobayashi | 237/69 |
| 4,865,120 | 9/1989 | Shiroki | 165/56 |

FOREIGN PATENT DOCUMENTS

| | | | |
|---|---|---|---|
| 0099592 | 7/1980 | Japan | 165/56 |
| 0108531 | 7/1982 | Japan | 165/56 |
| 0035337 | 3/1983 | Japan | 237/69 |
| 0095321 | 6/1984 | Japan | 165/56 |
| 0158919 | 9/1984 | Japan | 165/56 |
| 0225228 | 12/1984 | Japan | 165/56 |

Primary Examiner—Carroll B. Dority
Attorney, Agent, or Firm—Breiner & Breiner

[57] ABSTRACT

The present invention provides, as one embodiment thereof, a hot water heat panel which includes a wooden board; a wooden frame fixed onto the wooden board; a grid-like support unit having a number of compartments standing normal to the surface of the wooden board within the wooden frame; a plurality of parallel grooves extending from one of the side edges of the wooden frame to another opposing thereto, so as to pass through the surface of the support unit and the surface of the wooden frame continuous therewith, the grooves being suitable for receiving a hot water pipe; an undulated metallic plate fixed to the wooden frame so as to continuously cover the surface of the wooden frame, the surfaces of the grooves and the surface of the grid-like support unit. Further, the invention provides, as another embodiment thereof, a hot water heat panel which includes a wooden board; a wooden frame fixed onto the wooden board; a plurality of supports extending from one of the side edges of the wooden frame to another opposing thereto to form spaces between the supports and the frame; a plurality of parallel grooves extending from one of the side edges of the wooden frame from a point other than that from which the supports extend, to another opposing thereto, in spaced apart relationships with one another, the grooves being suitable for receiving a hot water pipe; and an undulated metallic plate fixed to the wooden frame so as to continuously cover the surface of the wooden frame, the surfaces of the supports and the grooves.

4 Claims, 2 Drawing Sheets

HOT WATER TYPE FLOOR HEATING PANEL

DETAILED DESCRIPTION OF THE INVENTION

1. Field of the Invention

The present invention relates to a floor heating panel having a hot water pipe incorporated therein and mainly used for housing.

2. Prior Art

As shown in Japanese Laid-Open Patent Publication No. 63-58035, the present inventor provided a floor heating panel incoporating a hot water pipe therein. The panel comprised a heat storage plate surrounded by a wooden frame and was provided with a plurality of grooves on the upper surface thereof and a hot water pipe disposed in and along the grooves through a metallic plate covering the surface of the heat storage plate.

According to the above floor heating panel, the metallic plate is supported by the heat storage plate so that the heat from the hot water pipe is uniformly transmitted to the heat storage plate and as a result, the room is more uniformly heated through a floor finishing material than when the panel comprises only the metallic plate. As the metallic plate is deprived of a part of its heat by the heat storage plate, the heating of the metallic plate becomes rather slow and even after the circulation of hot water through the hot water pipe is stopped, the heat stored in the heat storage plate is released therefrom. Such type of heating panel has therefore been suitable for use in a cold district where the heating operation is kept continued throughout every winter. However, it has had the problem that when it is used in a warm district, it fails to speedily heat the room and moreover where the atmospheric temperature suddenly rises, the temperature of the room does not fall due to the heat retained by the heat storage plate even after the circulation of hot water through the pipe is stopped but rises too high especially when it is so dusty and blowing so hard that one can not open the window.

SUMMARY OF THE INVENTION

The present invention has for its object to provide a floor heating panel which is capable of elevating and lowering the room temperature as speedily as possible.

In order to achieve the above object, the present invention provides, as one embodiment thereof, a floor heating panel which comprises a wooden board, a wooden frame fixed on the wooden board, a gridlike support arranged on the portion of the wooden board whithin the wooden frame and comprised of a number of compartments standing normal to the wooden board, a plurality of grooves extending from one of side edges of the wooden frame to another opposing thereto and an undulated metallic plate fixed to the wooden frame so as to fit in the grooves and to cover the surface of the support and that of the wooden frame continuous therewith. Further, the invention provides, as another embodiment thereof, a floor heating panel which comprises a wooden board, a wooden frame fixed on the wooden board, a plurality of supports arranged on the portion of the wooden board within the wooden frame in spaced apart relationships with one another and extending from one of the side edges of the wooden frame to another opposing thereto, a plurality of grooves extending from one of the side edges other than that from which the plurality of supports extend, to another opposing thereto and an undulated metallic plate fixed to the wooden frame so as to fit in the grooves and to cover the surfaces of the supports and the surface of the wooden frame continuous therewith.

The above-mentiond support may be made of a band-like wooden or aliminum plate.

OPERATION

The above-mentioned supports are used for bearing on the metallic plate over the wooden frame and a load applied thereon. As the contact area of the supports with respect to the metallic plate is small and the substantial volume of the supports themselves is also small, the amount of heat transmitted from the metallic plate to the supports is exremely small and air layers among the supports act as heat insulating layers, the temperature of the metallic plate can be quickly elevated or lowered so that it is possible to provide a floor heating panel capable of quickly controlling the room temperature. Further, when a heat reflective member such as an aluminum foil is inserted between the supports and the wooden board, the metallic plate can be more quickly heated.

EMBODIMENT OF THE INVENTION

Figure 1:
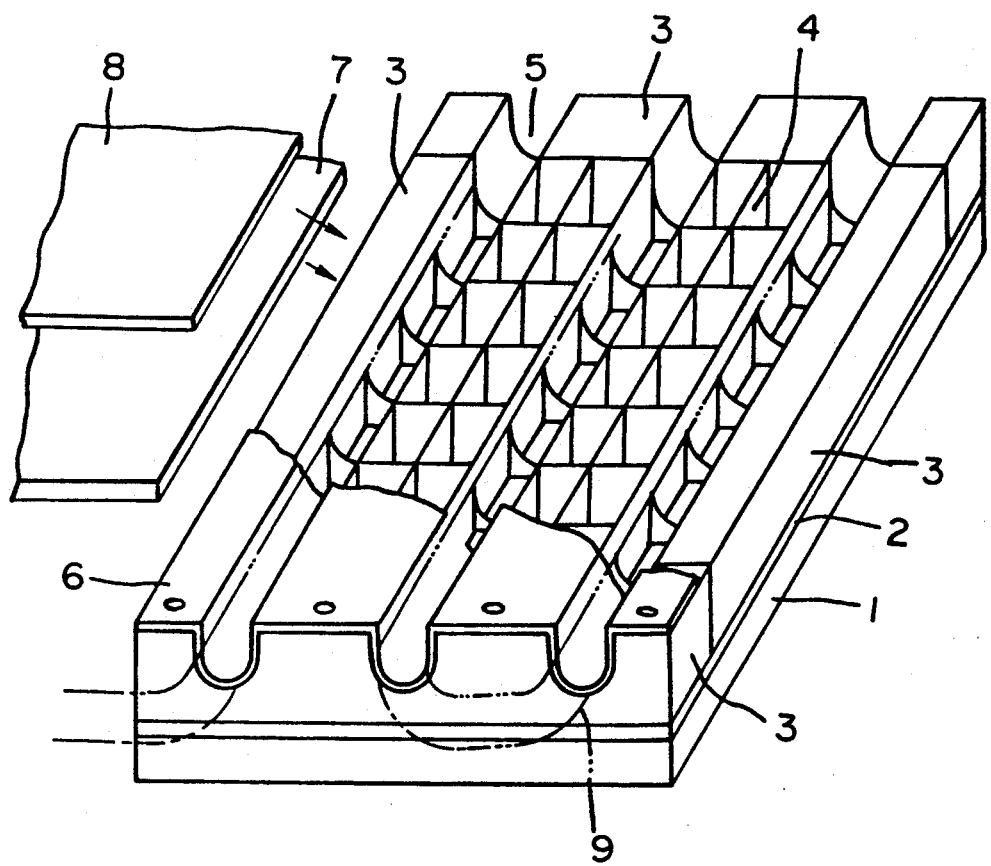
FIG. 1 is a perspective view (partly broken away) of a floor heating panel as one embodiment of the present invention.

Referring to FIG. 1 which shows one embodiment of the present invention, a square wooden frame 3 is placed over, and fixed to, a wooden board 2 made of a ply plywood by driving nails along the outer periphery of the latter. Within the wooden frame 3 there are fitted a plurality of supports 4 each made of a wooden or aluminum plate having the same thickness as the wooden frame 3. The supports 4 make themselves a grid having a number of compartments standing normal to the wooden board 2. Further, on the surface of the wooden frame 3 opposite the wooden board 2 and the surfaces of the supports 4 there are formed a plurality of grooves 5 extending from one of the side edges of the wooden frame 3 to the opposing side edge thereof and an undulated metallic plate 6 is nailed to the wooden frame 3 so as to fit in each of the grooves 5 and to cover the surfaces of the supports 4 and the surface of the woode frame 3 continuous therewith. Below the wooden board 2 there is attached a heat insulating plate 1.

The above-described panel is finished to a size of 90 cm×60 cm and a plurality of such panels are placed over a rough floor in sequence with the grooves 5 of one panel kept continuous with those of another and fixed to the floor with a bond and after disposing a hot water pipe 9 into the grooves covered with the metallic plate 6, a ply plywood 7 is placed on the panels and finally, a floor finishing material such as a carpet 8 or a flooring material is applied on the ply plywood.

It should be noted that although in the above embodiment the supports 4 forming a grid are used, the portions of the grid extending along the grooves may be omitted to allow only the remainder of the grid to act as supports and in that case, the supports are held in spaced apart relationships with one another such that both ends of each support fit in cutouts formed in the wooden frame 3.

Figure 2:
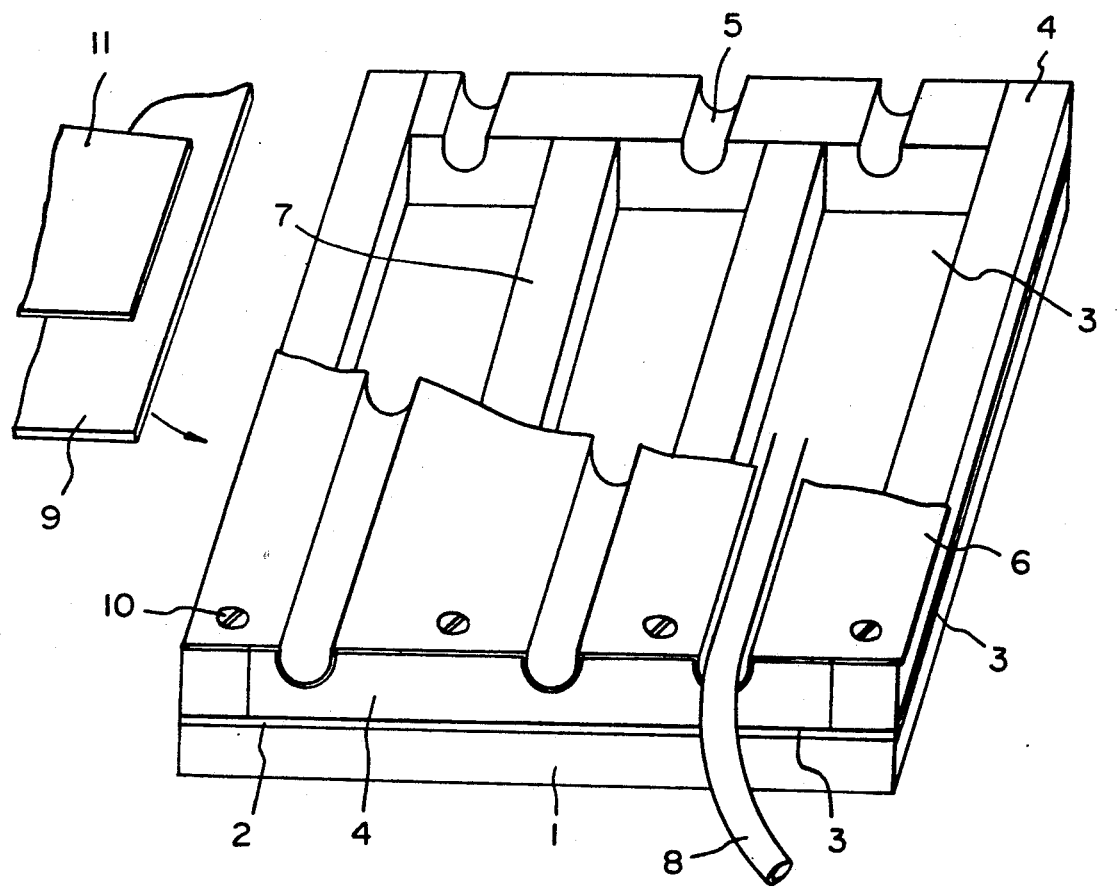
FIG. 2 is a perspective view (partly broken away) showing another embodiment of the present invention.

Referring to FIG. 2 showing a modified embodiment of the present invention, a wooden board 2 covered with a metal foil 3 is fixedly mounted on a heat insulating plate 1. A wooden frame 4 is provided on its one side element and opposite side element with grooves 5 and reinforced by support beams 7 bridging between the grooved side elements of the wooden frame. Thus formed wooden frame 4 is fixedly mounted on the wooden board 2. Then, an undulated metallic plate 6 overlies the wooden frame 4 and accordingly the wooden board 2 in such that the concave portions of the undulated metallic plate 6 are firmly fitted in the grooves 5 of the wooden frame 4. Thus assembled structure as above mentioned forms a panel unit.

A plurality of the panel units are placed side by side over a rough floor surface with the grooves 5 of one panel unit kept continuously with those of adjacent panel units. A hot water pipe 8 is disposed fittingly in the continuously formed grooves and then a plywood board 9 overlies the metallic plate 6 and the hot water pipe 8 and is secured to the wooden frame 4 by driving nails 10 passing through the metallic plate 6 so as to form a floor which can be finished by covering the plywood board 9 with a flooring material such as a carpet 11.

According to the present invention, it is possible to provide a hot water type floor heating panel capable of elevating and lowering the heating temperature in quick response to a variation of the atmospheric temperature.

What is claimed is:

1. A hot water heat panel comprising a wooden board; a wooden frame fixed onto the wooden board; a gridlike support unit having a number of compartments standing normal to the surface of the wooden board within the wooden frame; a plurality of parallel grooves extending from one of side edges of the wooden frame to another opposing thereto, so as to pass through the surface of the support unit and the surface of the wooden frame continuous therewith, said grooves being suitable for receiving a hot water pipe; an undulated metallic plate fixed to the wooden frame so as to continuously cover the surface of the wooden frame, the surfaces of the grooves and the surface of the gridlike support unit.

2. A hot water heat panel according to claim 1, wherein a metal foil is provided between the support unit and the wooden board.

3. A hot water heat panel comprising: a wooden board; a wooden frame fixed onto the wooden board; a plurality of supports extending from one of the side edges of the wooden frame to another opposing thereto to form spaces between said supports and said frame; a plurality of parallel grooves extending from one of the side edges of the wooden frame from a point other than that from which the supports extend, to another opposing thereto, in spaced apart relationships with one another, said grooves being suitable for receiving a hot water pipe; and an undulated metallic plate fixed to the wooden frame so as to continuously cover the surface of the wooden frame, the surfaces of the supports and the grooves.

4. A hot water heat panel according to claim 3, wherein a metal foil is provided between the supports and the wooden board.

* * * * *